Figure 1:
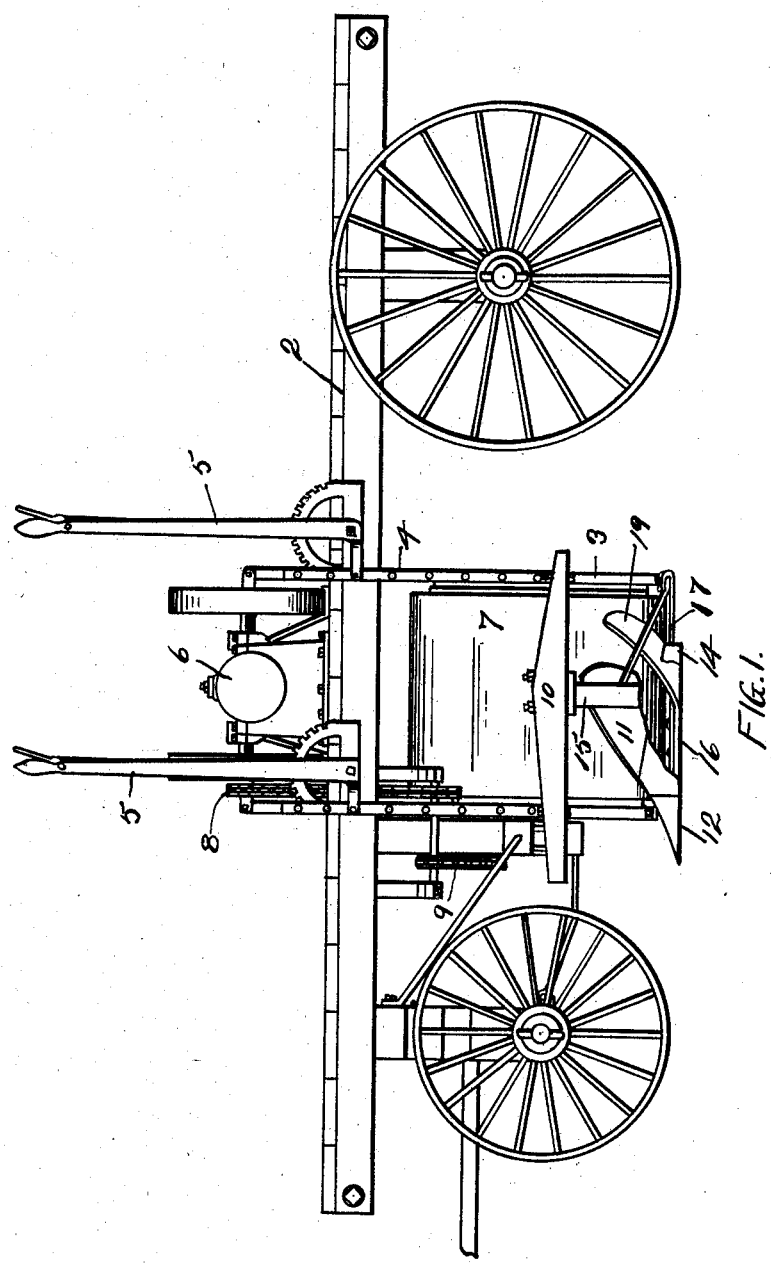

No. 757,417. PATENTED APR. 12, 1904.
R. RUSSELL.
DITCHING AND GRADING MACHINE.
APPLICATION FILED AUG. 28, 1903.
NO MODEL. 2 SHEETS—SHEET 1.

Witnesses

Inventor
Richard Russell
By
His Attorneys.

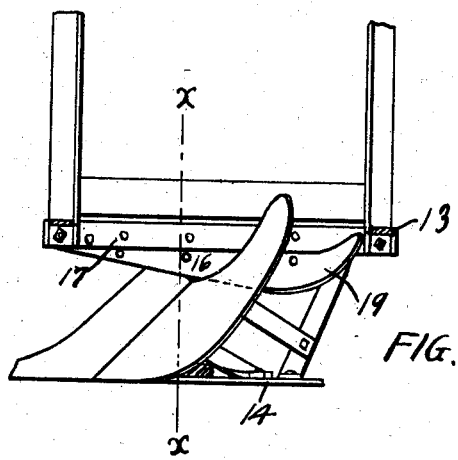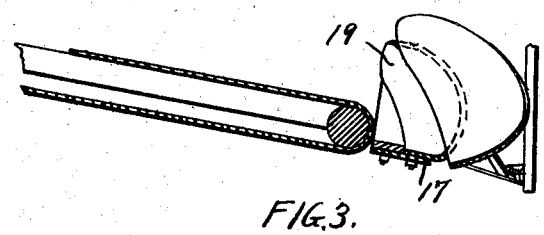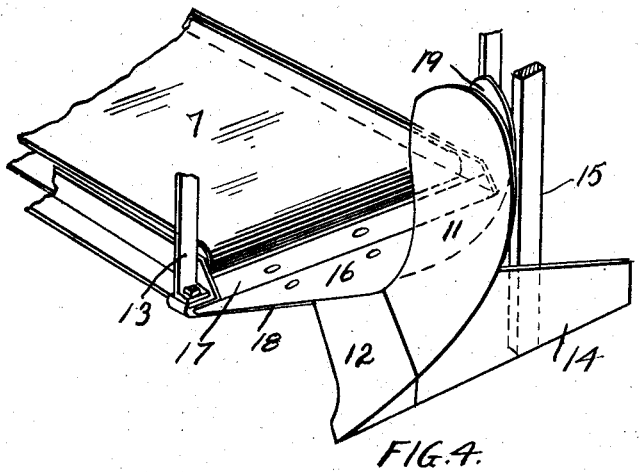

No. 757,417. Patented April 12, 1904.

UNITED STATES PATENT OFFICE.

RICHARD RUSSELL, OF STEPHEN, MINNESOTA.

DITCHING AND GRADING MACHINE.

SPECIFICATION forming part of Letters Patent No. 757,417, dated April 12, 1904.

Application filed August 28, 1903. Serial No. 171,047. (No model.)

*To all whom it may concern:*

Be it known that I, RICHARD RUSSELL, of Stephen, in the county of Marshall, State of Minnesota, have invented certain new and useful Improvements in Ditching and Grading Machines, of which the following is a specification.

My invention relates to that class of ditching and grading machines shown and described in a certain application for Letters Patent of the United States filed by me June 4, 1903, Serial No. 160,006.

The object of my invention is to provide improved means between the plow and the carrying-apron for cutting into the soil and directing it up onto the apron.

The invention consists generally in various constructions and combinations, all as hereinafter described, and particularly pointed out in the claims.

In the accompanying drawings, forming part of this specification, Figure 1 is a side elevation of a ditching and grading machine embodying my invention. Fig. 2 is a plan view of a plow and the receiving end of the apron-carrying frame. Fig. 3 is a section on the line $x\ x$ of Fig. 2. Fig. 4 is a perspective view of the receiving end of the apron and its frame, showing the position of the plow and the auxiliary moldboard with respect thereto.

In the drawings, 2 represents a wheeled frame, beneath which an apron-carrying frame 3 is suspended in the manner set forth in my pending application referred to, the receiving end of said frame being tilted and adjusted vertically by means of bars 4 and operating-levers 5. An engine 6 is mounted on the machine-frame and arranged to drive an apron 7 through chains 8 and 9, all as set forth in my pending application. 10 represents a plow-beam, 11 the moldboard, and 12 the plow-point, that is arranged to dig into the soil and direct it toward the receiving end of the apron 7. The plow-beam 10 is connected by suitable braces (not shown) with the apron-frame 3, and suitable standards 13 connect the receiving end of said frame with said braces and aid in supporting the same. A landside 14 is provided on the said plow, connected with the beam by a post 15.

In the operation of a machine of this kind I have found it desirable to provide some means in the rear of the moldboard for directing the material gathered up by the plow onto the receiving end of the apron. I therefore prefer to provide an auxiliary moldboard consisting of a plate 16, secured by bolts or other suitable means to a cross-bar 17 at the receiving end of the apron-frame and having a sharpened edge 18, that coöperates with the edge of the plow-point to dig into the soil, and a rear upwardly and inwardly turned portion 19, that acts as an auxiliary or supplementary moldboard to direct the soil after it has passed the moldboard proper onto the receiving end of the apron and insure delivery to the apron of practically all the gravel that is gathered up by the plow-point. This rearwardly-turned portion of the supplementary moldboard is curved in substantially the same manner as the moldboard proper and may be used as a substitute for the fin-colter device described in my pending application.

I claim as my invention—

1. The combination, with a traveling apron, of a plow provided at the receiving end of said apron, and a supplementary moldboard interposed between said plow and apron, for the purpose specified.

2. The combination, with an apron and its frame, of a plow provided at the receiving end of said apron, and a supplementary moldboard rigidly secured to said frame and having an upwardly and inwardly curved portion in the rear of said plow-moldboard, for the purpose specified.

3. The combination, with an apron and its frame, of a plow, and a plate provided between said plow and frame and secured to the latter and having its forward edge forming a continuation of the plow-point and its rear edge upwardly turned, substantially as described.

In witness whereof I have hereunto set my hand this 13th day of August, 1903.

RICHARD RUSSELL.

In presence of—
RICHARD PAUL,
S. V. GRIFFIN.